W. S. HAMM.
LANTERN.
APPLICATION FILED OCT. 11, 1907.
910,672.
Patented Jan. 26, 1909.
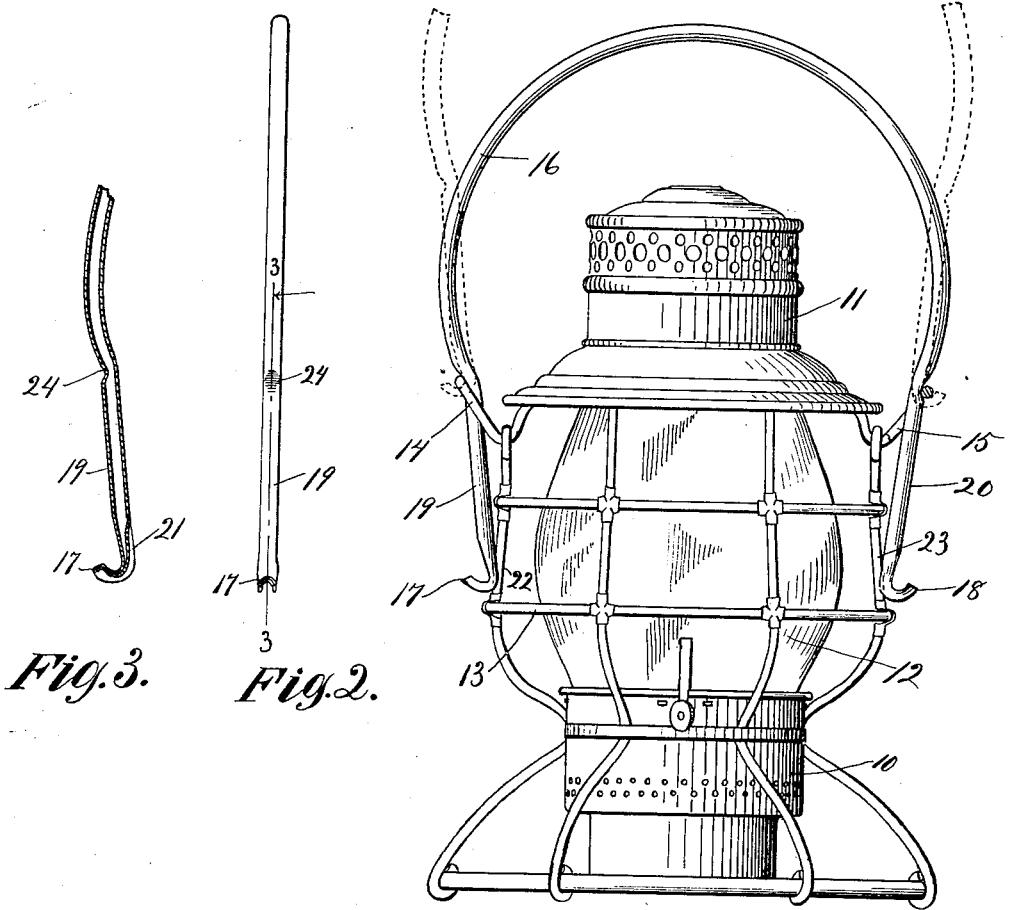
Fig. 1.
Fig. 3.   Fig. 2.
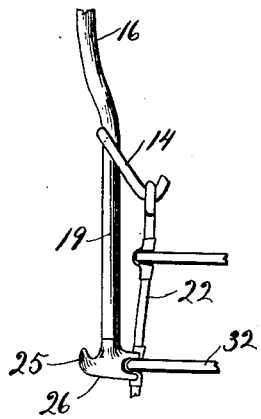
Fig. 4.
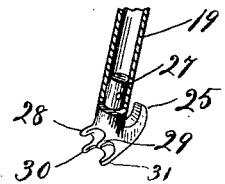
Fig. 5.
Witnesses:
W. H. Cotton
Charles B. Gillson.
Inventor
William S. Hamm.
By Louis K. Gillson
Atty.

UNITED STATES PATENT OFFICE.

WILLIAM S. HAMM, OF HUBBARD WOODS, ILLINOIS.

LANTERN.

No. 910,672.　　　　Specification of Letters Patent.　　　　Patented Jan. 26, 1909.

Application filed October 11, 1907. Serial No. 397,009.

*To all whom it may concern:*

Be it known that I, WILLIAM S. HAMM, a citizen of the United States, and resident of Hubbard Woods, county of Cook, and State of Illinois, have invented certain new and useful Improvements in Lanterns, of which the following is a specification, and which are illustrated in the accompanying drawings, forming a part thereof.

This invention relates to that class of lanterns which are provided with guard frames or baskets and a carrying bail, the object of the invention being to provide a bail which may have a swinging engagement with the lantern or may be locked thereto so as to be rigid with the lantern frame and which consists in a structure hereinafter described and which is illustrated in the accompanying drawings, in which:

Figure 1 is a side elevation of the lantern, the bail being shown in its fixed position in solid lines and in its swinging position in dotted lines; Fig. 2 is an edge view of the bail; Fig. 3 is a detail section of the bail on the line 3, 3 of Fig. 1; Fig. 4 is a detail of the guard frame and bail showing a modified form of construction; and Fig. 5 is a detail of the end of the bail shown in Fig. 4, partly in section.

The lantern shown is provided with the usual base ring 10 for receiving the font, dome 11 and globe 12. The base ring and dome are connected and the globe is protected by a guard-frame or basket 13 shown as being made of wire. A pair of loops 14, 15 project laterally and upwardly from the upper portion of the guard-frame for receiving the bail 16 which is in loop-form and has at its lower ends hooks 17, 18 for engaging the loops 14, 15. The lower ends 19, 20 of the two arms of the bail are substantially straight and may be thrust downwardly through the loops 14, 15 to bring the heels of the hooks 17, 18, which are preferably longitudinally grooved, as shown at 21, into engagement with vertical members 22, 23 of the guard-frame. The loops 14, 15 are of such size and shape that when the bail is thus thrust downwardly, it will bind against their outer ends and against the guard-frame, slightly flexing either the loop or the bail or both. Preferably at the upper ends of these straight sections 19, 20 the bail is notched or indented in its outer faces, as shown at 24 to form a shoulder for more securely engaging the loops. When the bail is in its upper position, as shown in dotted lines in Fig. 1, the lantern will freely swing upon it but when in its lower position, as shown in solid lines in Fig. 1, the bail and lantern are rigidly connected.

In the construction illustrated in Figs. 1, 2 and 3 of the drawings, the hooks 17, 18 are integral with the bail which is shown as a tubular rod but in the construction illustrated in Figs. 4 and 5, the hook 25 is formed on a block 26 having a stem 27 entering the lower end of the bail, the inner face of the block being provided with four spurs 28, 29, 30 and 31, which will, when the bail is forced downwardly, straddle both the vertical member 22 and one of the horizontal rings 32 of the guard-frame, thus more securely holding the bail in its fixed position.

These lanterns are especially adapted for the use of railway trainmen who employ them for signaling purposes and sometimes find it convenient to have the lantern free to swing on the bail, while at other times it is preferred to have it rigid with the bail. The construction here illustrated and described provides for both conditions, and the change can be instantly and conveniently made.

I claim as my invention—

1. In a lantern in combination, a guard frame having lateral loops, a bail slidably mounted in the loops, the parts being so disposed that when the bail is in its lowest position its lower ends bear inwardly against the guard-frame and its side members bear outwardly against the loops.

2. In a lantern in combination, a guard frame having lateral loops and upright members, a bail slidably mounted in the loops, the parts being so disposed that when the bail is in its lowest position its lower ends bear inwardly against the guard-frame and its side members bear outwardly against the loops.

3. In a lantern, in combination, a guard-frame, and a bail, the ends of the bail engaging the frame at two points by a lever action under the strain of its own elasticity.

4. In a lantern in combination, a guard frame having loops, a bail slidably mounted in the loops and having recesses at its ends to engage the guard frame and shoulders spaced from its ends for engaging the loops.

5. In a lantern in combination, a guard frame, upstanding and outwardly inclined loops at the upper end of the frame, and a bail slidably mounted in the loops and having hooks at its ends for engagement with the loops, the parts being so formed that when the bail is advanced downwardly through the loops its ends fulcrum on the frame and bear outwardly against the loops by a lever action.

WILLIAM S. HAMM.

Witnesses:
 LOUIS K. GILLSON,
 CHARLES B. GILLSON.